United States Patent
Kawaji et al.

(10) Patent No.: US 9,853,322 B2
(45) Date of Patent: Dec. 26, 2017

(54) SOLID ELECTROLYTE AND ALL-SOLID STATE LITHIUM ION SECONDARY BATTERY

(71) Applicant: Hitachi, Ltd., Tokyo (JP)

(72) Inventors: Jun Kawaji, Tokyo (JP); Takahiro Yamaki, Tokyo (JP)

(73) Assignee: HITACHI, LTD., Tokyo (JP)

(*) Notice: Subject to any disclaimer, the term of this patent is extended or adjusted under 35 U.S.C. 154(b) by 497 days.

(21) Appl. No.: 14/454,215

(22) Filed: Aug. 7, 2014

(65) Prior Publication Data
US 2015/0044575 A1 Feb. 12, 2015

(30) Foreign Application Priority Data
Aug. 9, 2013 (JP) .................. 2013-165731

(51) Int. Cl.
*H01M 10/052* (2010.01)
*H01M 10/0562* (2010.01)

(52) U.S. Cl.
CPC ..... *H01M 10/0562* (2013.01); *H01M 10/052* (2013.01); *H01M 2300/0071* (2013.01); *Y02T 10/7011* (2013.01)

(58) Field of Classification Search
CPC ................................. H01M 10/0562
USPC .......................................... 429/320
See application file for complete search history.

(56) References Cited

U.S. PATENT DOCUMENTS

2011/0318652 A1* 12/2011 Furuya ..................... H01B 1/08
429/322

FOREIGN PATENT DOCUMENTS

| JP | 07-320971 | 12/1995 |
| JP | 2012-224520 A | 11/2012 |
| JP | 2013-032259 A | 2/2013 |

OTHER PUBLICATIONS

Machine Traslation of JP 2012-224520, Imagawa et al., extracted on Dec. 8, 2016.*
Sumaletha Narayanan, Effect of Y substitution for Nb in Li5La3Nb2O12 on Li ion conductivity of garnet-type solid electrolytes, Apr. 5, 2011, 8085-8090.*

* cited by examiner

*Primary Examiner* — Nicholas P D'Aniello
*Assistant Examiner* — Abibatu O Ojo-Amoo
(74) *Attorney, Agent, or Firm* — Foley & Lardner LLP

(57) ABSTRACT

In a Li ion conductivity oxide solid electrolyte containing lithium, lanthanum, and zirconium, a part of oxygen is substituted by an element M (M=N, Cl, S, Se, or Te) having smaller electronegativity than oxygen.

5 Claims, 3 Drawing Sheets

SOLID ELECTROLYTE AND ALL-SOLID STATE LITHIUM ION SECONDARY BATTERY

BACKGROUND OF THE INVENTION

1. Field of the Invention

The present invention relates to a solid electrolyte and an all-solid state lithium ion secondary battery having Li ion conductivity.

2. Description of the Related Art

A Lithium ion secondary battery is an electrochemical device that stores and releases lithium by storing/detaching lithium with electron transfer in two electrode layers containing an active material capable of storing/detaching lithium ions.

Since a lithium ion that is a charge carrier has a small atomic number and high ionization tendency, lithium ion secondary batteries have higher energy density per volume and higher energy density per weight than other secondary batteries. Therefore, the lithium ion secondary batteries are widely used as a power source for portable devices, such as mobile phones or notebook PCs.

Further, applications to a power source for hybrid automobiles and electric automobiles, and a power source for power storage of power generation systems using renewable energy, such as photovoltaic power generation or wind power generation have been proceeding.

Here, many of the lithium ion secondary batteries currently put to practical use a flammable organic-solvent-electrolyte solution as an electrolyte. Therefore, there are risks of liquid leakage and ignition, and development of a highly safe lithium ion secondary battery without such risks is desired. As a battery without the risks of liquid leakage and ignition, all-solid state lithium ion secondary batteries that use non-flammable solid electrolytes having Li ion conductivity as an electrolyte have been developed in various places.

Among the all-solid state lithium ion secondary batteries, secondary batteries using a ceramic material having a structure that conducts lithium ions have excellent durability at a high temperature, and have drawn attention.

The ceramic material that conducts lithium ions is made of Li ions that serve as carriers and a polyanion framework having a space that serves as a pathway of the Li ions, and the ceramic materials are classified into various types according to constituent elements and a structure of the polyanion framework.

Currently, examples of the ceramic electrolyte material currently widely examined include a sulfide solid electrolyte that contains lithium-sulfur, phosphorus-sulfur, and transition metal-sulfur bonds in a polyanion, and an oxide solid electrolyte that contains lithium-oxygen, phosphorus-oxygen, and transition metal-oxygen bonds.

The sulfide solid electrolyte has a large atomic radius of sulfur and large polarization, and is thus suitable for conduction of lithium transfer. Further, the sulfide solid electrolyte is easily deformed by external pressure, and can increase contact areas among electrolyte particles or between the active material and electrolyte particles by compression at the time of manufacturing a battery. Therefore, a large number of all-solid state lithium secondary batteries have been examined using the sulfide solid electrolyte.

However, the sulfide solid electrolyte is extremely unstable in the atmosphere, and is decomposed by absorption of water and generates hydrogen sulfide that is a toxic gas. Therefore, there is room for improvement in terms of safety in manufacturing and in use.

Meanwhile, the oxide electrolyte is stable in the atmosphere and has excellent thermal durability. Therefore, the oxide electrolyte is promising as a highly safe electrolyte for all-solid state battery. Issues of the oxide electrolyte are high ion conductivity, wide chemical window, and especially, excellent reduction resistance.

As the oxide electrolyte having Li ion conductivity, a NASICON type glass ceramics $Li_{1.5}Al_{0.5}Ge_{1.5}(PO_4)_3$ (LAGP) and $Li_{1.3}Al_{0.3}Ti_{1.7}(PO_4)_3$ have been examined. However, it has been reported that reduction action is caused at from 0.5 to 2.4 V, both inclusive, with respect to a lithium electrode in each oxide electrolyte, and the ion conduction is impaired. Therefore, it cannot be said that the reduction resistance is high.

In contrast, a garnet type oxide made of lithium, lanthanum, zirconium, and the like has excellent reduction resistance because it is stable even if being in contact with lithium, and is a strong candidate of the solid electrolyte. In recent years, a garnet type oxide $Li_7La_3Zr_2O_{12}$ has been developed by a group of Weppner, et al., and it has been reported that the garnet type oxide has ion conductivity of $2.3 \times 10^{-4}$ Scm$^{-1}$, and activation energy of the ion conduction of 33 kJ/mol at room temperature.

Various element substitutions for Li, La, and Zr sites have been disclosed for improvement of the ion conductivity of the garnet type oxide $Li_7La_3Zr_2O_{12}$.

In JP 07-320971 A reports $Li_{5+x}La_3(Zr_x,A_{2-x})O_{12}$ in which the zirconia site is substituted by an aliovalent cation, such as Ta or Nb, and reports that the activation energy of 30 kJ/mol and the ion conductivity of $8 \times 10^{-4}$ S/cm can be obtained with the Nb substitution.

Further, JP 2012-224520 A discloses a composition in which the element Sr or Ca is substituted for the La site and the element Nb is substituted for the Zr site as compositions that obtain relatively high ion conductivity, even in a low sintering temperature, and reports that a sintered body at 1100° C. has the activation energy of 39 kJ/mol (0.40 eV) and the ion conductivity of $2.4 \times 10^{-4}$ S/cm.

Meanwhile, JP 2013-032259 A discloses a garnet type solid electrolyte in which the Li site is substituted by Al and Ga, and reports that the garnet type structure becomes stabilized by the element substitution of Al, Ga, and the like.

SUMMARY OF THE INVENTION

In JP 07-320971 A and JP 2012-224520 A are effective for improvement of characteristics of the garnet type $Li_7La_3Zr_2O_{12}$, and the ion conductivity obtained by JP 2012-224520 A is a value close to the above-described NASICON type oxide and promising. However, the ion conductivity is lower than a sulfide solid electrolyte, and further decrease in the activation energy and improvement of the ion conduction are required.

In view of the foregoing, an objective of the present invention is to provide constituent elements, a structure, and a manufacturing method for enhancing ion conduction improvement of a $Li_7La_3Zr_2O_{12}$ type solid electrolyte, resulting in improvement of charge-discharge property of an all-solid state lithium ion battery.

A garnet type solid electrolyte for lithium ion secondary battery having a composition formula expressed by $Li_{7+x}La_3Zr_2O_{12-x}M_x$ (in the formula, M is any of N, Cl, S, and Se, and $0<x<1.2$). By substitution of oxygen, which has high electronegativity and strongly attracts lithium cation, with another element, the mobility of lithium ions can be increased, and ion conduction of the garnet type solid electrolyte can be improved.

According to the present invention, the ion conductivity of the solid electrolyte can be improved, and improvement of charge-discharge property of an all-solid state Li ion battery using the solid electrolyte can be achieved.

DESCRIPTION OF THE PREFERRED EMBODIMENTS

Hereinafter, examples according to the present invention will be described with reference to the drawings. Note that the present invention is not limited to each of a plurality of embodiments (examples) taken up here, and may appropriately combine the plurality of embodiments.

The inventors of the present invention considered that a cause of low ion conductivity of a garnet type solid electrolyte is high electronegativity of oxygen of $Li_7La_3Zr_2O_{12}$. The garnet type solid electrolyte is an oxide solid electrolyte having Li ion conductivity and containing lithium, lanthanum, and zirconium, and a representative example includes one having a structure of $Li_7La_3Zr_2O_{12}$.

Figure 1A:
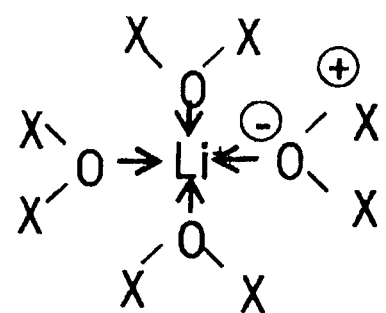
FIGS. 1A and 1B are schematic diagrams of oxygen-Li bond in a garnet type solid electrolyte.
Figure 1B:
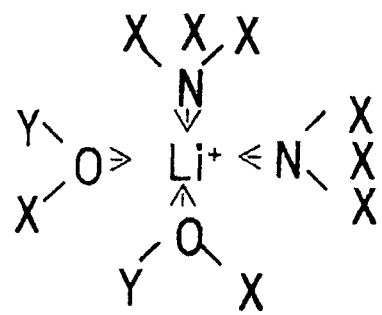
Figure 2:
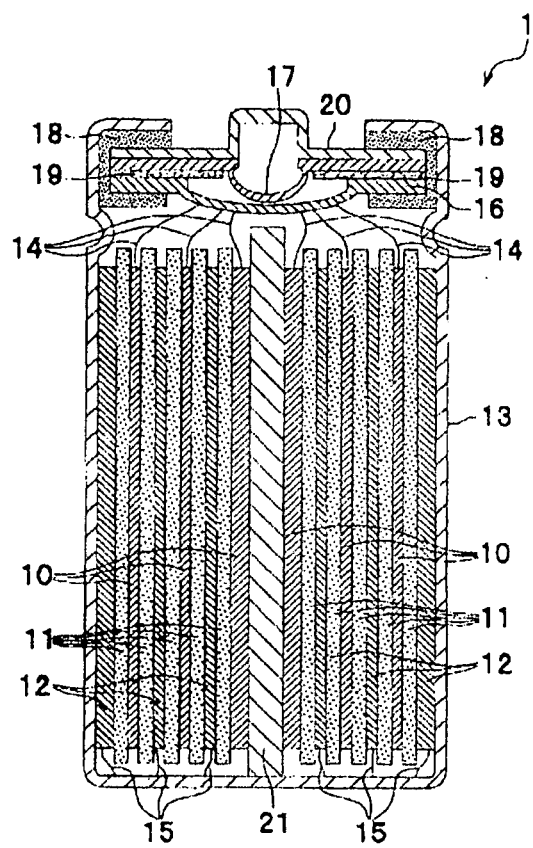
FIG. 2 is an example of a cross-sectional schematic diagram of an all-solid state lithium ion secondary battery.

FIGS. 1A and 1B are diagrams schematically illustrating electrostatic interaction between oxygen and Li in a crystal of the garnet type solid electrolyte $Li_7La_3Zr_2O_{12}$. In the drawing, electrical attraction force that a Li ion is subjected is indicated by the arrows, the electrical attraction force being caused by unshared electron pair included in nearby oxygen. Oxygen has high electronegativity, and thus an interaction between oxygen and Li is strong. Oxygen strongly attracts Li, and thus Li conductivity becomes low (FIG. 1A). In FIG. 1A, Li is subjected to attraction from four nearby oxygen's. However, an actual number is not limited to four. Here, the electronegativity is a relative index of intensity of attracting electrons by atoms in a molecule, and a larger value means that atoms are more likely to attract surrounding electrons.

The oxide solid electrolyte, such as a garnet type solid electrolyte, is made of lithium ions and a polyanion framework that includes a space through which lithium ions can pass. The inventors considered that the conductivity of lithium ions can be improved by decrease in electrostatic attraction that the polyanion framework exerts on lithium ions. As a result of diligent examination, the inventors has confirmed that the activation energy of Li conduction can be decreased by substitution of a part of oxygen in the framework by an element having lower electronegativity than oxygen, such as nitrogen, sulfur, chlorine, selenium, tellurium, or the like, and has reached the present invention. FIG. 1B is a schematic diagram of when a part of oxygen is substituted by an element having lower electronegativity than oxygen. By substitution of oxygen by an element having lower electronegativity than oxygen, the electrostatic attraction exerted on the lithium ions can be decreased. FIG. 1B illustrates a configuration in which a part of oxygen is substituted by nitrogen. However, the substitution is not limited to the configuration, and the effect can be exerted by substitution with another element having low electronegativity.

As the element M that can substitute for a part of oxygen and having lower electronegativity than oxygen, N, Cl, S, Se, Te, or the like can be used, for example.

The electronegativity referred here is a relative index of intensity of attracting electrons by atoms in a molecule, and a larger value means that atoms are more likely to attract surrounding electrons. According to the definition of Pauling, the electronegativity of oxygen is 3.44, which is the second largest after fluorine of 3.98. The inventors of the present invention considered that, since the electronegativity of oxygen is large, electrons are biased to oxygen in the polyanion framework, and peripheries of oxygen are charged negative, so that electrostatic attraction is applied to the nearby lithium ion, and diffusion is impeded. By addition of nitrogen (electronegativity of 3.04), chlorine (3.16), sulfur (2.58), selenium (2.55), or tellurium (2.1) into the framework as an element M having lower electronegativity, improvement of the ion conductivity becomes possible.

As the substitution element M, it is especially favorable to use nitrogen in terms of ionic radii and electronegativity. A structure of a garnet type solid electrolyte in which nitrogen is substituted for a part of oxygen can be expressed by $Li_{7+x}La_3Zr_2O_{12-x}N_x$. At this time, the nitrogen abundance x in the formula weight is desirably from 0.1 to 1.2.

The composition ratio of the element M to oxygen is favorably from 0.1 to 10%. Further, from the perspective of effect of ion conductivity improvement by easing of the electrostatic attraction, the composition ratio is favorably from 1 to 5%. If the composition ratio is lower than 1%, substitution effect becomes insufficient although there is some effect, and if the composition ratio is larger than 5%, maintenance of a crystal structure becomes difficult.

The garnet type solid electrolyte exerts large ion conductivity when the crystal structure identified by an XRD or the like indicates a cubic structure. By substitution of oxygen of the structure of $Li_7La_3Zr_2O_{12}$ by another, element, the crystal may be maintained as a cubic structure, or the structure is collapsed and may become a tetragonal structure. However is favorable to avoid collapse of the cubic structure. By causing of the composition ratio of the element M to oxygen to be 10% or less, the cubic structure can be maintained. By maintaining of the cubic structure garnet structure, the lithium conduction path in the crystal becomes continuous, and high ion conductivity can be obtained.

Further, in the solid electrolyte according to the present invention, sites other than oxygen can be appropriately substituted by other elements. For example, the lithium site can be substituted by Al or Ga that is a metal type of oxidization. The structure in which a part of the lithium site is substituted by Al or Ga, and a part of the oxygen site is substituted by N can be expressed by a chemical composition formula $Li_{7+x-3y}A_yLa_3Zr_2O_{12-x}N_x$ (A=Al or Ga). A part of the lithium site is substituted by Al or Ga and a part of the oxygen site is substituted by N, and structure has an Al—N bond in the framework, whereby an electrolyte becomes to have excellent stability of the framework and excellent ion conductivity. The reason of this is not certain. However, Al substitutes for the lithium site, and thus nitrogen introduced with the Al—N bond is arranged near the lithium conduction path. As a result, it is expected that the lithium ion conduction can be effectively facilitated.

As for solid electrolytes (102 and 203), the solid electrolyte of the present invention can be used alone, or can be mixed with other lithium ion conduction materials and used. Among solid materials that conduct lithium ions, a non-flammable inorganic solid electrolyte needs to be included from the perspective of safety. To be specific, lithium halide, such as LiCl or LiI, may be included in an oxide glass represented by $Li_{1.4}Al_{0.4}Ti_{1.6}(PO_4)_3$, $LiAlGe(PO_4)_3$, $Li_{3.4}V_{0.6}Si_{0.4}O_4$, $Li_2P_2O_6$, or the like, in a perovskite-type oxide represented by $Li_{0.34}La_{0.51}TiO_{2.94}$, or in an oxide conductor.

Further, a sintering additive for binding solid electrolyte particles can be used among the solid electrolyte (102 and 203) particles. As the sintering additive, an inorganic material containing lithium, such as $Li_3PO_4$, $Li_3BO_3$, or a glass body can be used, other than $Al_2O_3$ or $B_2O_3$.

While $Li_7La_3Zr_2O_{12}$ has been exemplarily described as the garnet type solid electrolyte in which oxygen is substituted, $Li_5La_3Ta_2O_{12}$, $Li_5La_3Nb_2O_{12}$, $Li_6BaLa_2Ta_2O_{12}$ or the like can be used, other than $Li_7La_3Zr_2O_{12}$. Among them, $Li_7La_3Zr_2O_{12}$ is especially favorable from the perspective of easiness of substitution and largeness of ion conductivity.

An example of a method of manufacturing a solid electrolyte of the present invention will be described. To obtain the solid electrolyte, it is necessary to go through (1) a process of mixing raw materials of constituent elements (mixing process), (2) a process of calcining the raw materials at a predetermined temperature and changing the state of the raw material, such as degassing (pre-calcination), (3) a process of pulverizing the materials after pre-calcination and molding or shaping the materials into a predetermined molded body (molding or shaping), and (4) a process of calcining the molded body at a molding calcination temperature (final calcination).

(1) Mixing Process

In this process, raw materials, a state of which is to be changed, such as gas generation by calcination, are mixed. When $Li_7La_3Zr_2O_{12}$ is produced, the raw materials of the constituent elements are put and mixed such that Li:La:Zr becomes 7:3:2. As the raw materials, carbonate, sulfate, nitrate, oxalate, hydroxide, or an oxide containing metal that is a constituent elements can be used. As the solid electrolyte, oxygen elements of which are not substituted, carbonate that causes carbon dioxide or hydroxide that causes water vapor by thermal decomposition by heating is desirable.

When a part of oxygen is substituted by the element M, a metal salt of the substitution element M is mixed in the mixing process. Chloride can be mixed as a substitution of a part of oxygen by chlorine, nitride can be used as a substitution of a part of oxygen by nitrogen, and sulfide can be mixed as a substitution of a part of oxygen by sulfur. For example, zirconium nitride (Zr—N), zirconium chloride, zirconium sulfide, zirconium selenide, or zirconium telluride can be used as a substitution of a part of oxygen by nitrogen, chlorine, sulfur, selenium, or tellurium. Further, aluminum nitride (AlN) or gallium nitride (GaN) can be used for $Li_{7+x-3y}A_yLa_3Zr_2O_{12-x}N_x$ (A=Al or Ga) that is one of the solid electrolytes according to the present invention.

As a method of mixing the raw materials, powder can be mixed by a dry method, or may be mixed by a wet method in a state where a solvent is added to the powder. While the mixing method is not especially limited, planetary ball mill, jet mill, or attritor can be employed. There is no special limitation to the solvent for wet mixing as long as the raw material such as Li is not dissolved into the solvent. An example includes a lower alcohol, such as ethanol. While a mixing time is arbitrary, it is favorable to use the method between one hour and ten hours.

Mixing of a metal salt can be determined based on metal composition ratios in a planned electrolyte. For example, as for $Li_6Al_{0.5}La_3Zr_2O_{11.5}N_{0.5}$ where A is Al, x=0.5, and y=0.5, among the above-described $Li_{7+x-3y}A_yLa_3Zr_2O_{12-x}N_x$, $Li_2CO_3$, $La(OH)_3$, $ZrO_2$, and AlN can be used as starting materials and it is favorable to have $Li_2CO_3$:$La(OH)_3$:$ZrO_2$:AlN=3:3:2:0.5 as molar ratios of the starting materials. Note that the lithium salt may be excessively added by 0 to 10% of stoichiometric mixture ratio because Li of the lithium salt may sometimes be volatilized by heating. The substitution ratios of other elements for the oxygen site can be adjusted by a metal salt amount containing elements to be substituted, a charge amount of AlN here, and a gas atmosphere during heating.

(2) Pre-calcination Process

In this process, the raw materials are subjected to thermal treatment at a temperature lower than a final calcination, a part of the raw materials is gasified, and preparation for obtaining a solid electrolyte with high bulk density at the time of final calcination is made. While a pre-calcination temperature is arbitrary, as for carbonate or hydroxide that generates a gas by thermal decomposition, heating at a decomposition temperature or more is necessary. For example, it is favorable to perform heating at from 700° C. to 1000° C., both inclusive. As for the calcination atmosphere, the calcination may be performed in the atmosphere. However, when the substitution elements of the oxygen portion are volatilized by heating, the calcination can be performed in a gas atmosphere made of these elements. For example, in the pre-calcination process of a solid electrolyte in which a part of oxygen was nitrided, the atmosphere can be a gas containing a substitution element, such as an ammonia gas. Further, oxygen can be added thereto.

(3) Molding or Shaping Process

In this process, a sample after the pre-calcination is pulverized, and a molded body with high bulk density is produced for final calcination. The pulverization may be performed with an agate mortar, or may be performed with the above-described mixing/pulverizing device. The molding is performed such that the pulverized sample is added to a mold, and is uniaxially pressed. Alternatively, hot press, cold isostatic pressing (CIP), hot isostatic pressing (HIP), or the like can be used.

(4) Final Calcination Process

In this process, thermal treatment is performed at a higher temperature than the pre-calcination, and a desired crystal phase is obtained and a formed body of a solid electrolyte with high bulk density is obtained at the same time. The processing temperature is the pre-calcination temperature or more, and a high temperature for obtaining a cubic structure garnet structure that serves as a high ion conduction phase is necessary. To be specific, it is desirable to perform heating at from 1000° C. to 1200° C. At this time, to suppress volatilization of the substitution element for lithium or oxygen, it is desirable to perform heating with a configuration in which a pellet formed in the process (3) is covered with the pre-calcinated powder (hereinafter, powder bed) obtained in the progress (2). Note that the substitution element is easily volatilized, and thus a powder material containing the substitution element can be added to the powder bed. In the case of nitrogen substitution, it is effective to add urea. Further, similarly to (2) pre-calcination process, this process can be performed in the gas atmosphere made of the substitution element in a heating atmosphere. For example, in the pre-calcination process of a solid electrolyte in which a part of oxygen was nitrided, the atmosphere can be a gas containing a substitution element, such as an ammonia gas. Further, oxygen can be added thereto. By adjusting of atmospheric concentration and the calcination temperature, the substitution ratio of oxygen in the framework can be adjusted. The calcination atmosphere of the pre-calcination and the final calcination can be the atmosphere. However, when the substitution elements of the oxygen portion are volatilized by heating, the calcination can be performed in a gas atmosphere containing the substitution elements. An example of the gas containing the substitution elements includes hydride. Ammonia ($NH_3$) can be used in the case where the substitution element is nitrogen, hydrogen chloride (HCl) in the case of chlorine, hydrogen sulfide ($H_2S$) in the case of sulfur, hydrogen selenide ($H_2Se$) in the case of selenium, and hydrogen telluride ($Te_2S$) in the case of tellurium. These gases can be used alone, or can be mixed with oxygen, air, or an inert gas, such as argon. For example, in the pre-calcination process of a solid electrolyte in which a part of oxygen is nitrided, the atmosphere can be of oxygen+ammonia.

According to the manufacturing method described in detail, a lithium-lanthanum-zirconium oxide in which a part of the oxygen site is substituted by elements having small electronegativity can be obtained, and a garnet type structure can be obtained by adjustment of calcination conditions. In the present invention, calcination is performed in the gas atmosphere containing the substitution elements instead of in the atmosphere or in the oxygen atmosphere. For example, when oxygen is substituted by nitrogen, calcination is performed in an atmosphere containing ammonia, whereby a garnet type solid electrolyte in which a part of oxygen is substituted by nitrogen can be manufactured. At this time, as the ratio of the gas containing the substitution element, such as ammonia, 30 to 90% is favorable. If oxygen is too much, the oxygen ratio in the garnet structure becomes large, and if oxygen is too little, the substitution ratios of other elements become large, and the crystal structure is easily collapsed.

Whether the above-described solid electrolyte has been obtained can be confirmed using various analysis methods. The chemical composition can be evaluated by inductively-coupled plasma atomic emission spectrometry (ICP-AES), x-ray photoelectron spectroscopy (XPS) analysis, x-ray fluorescence spectrometry (XRF) analysis, or the like. Whether the cubic structure garnet structure has been obtained can be identified by x-ray diffractometry (XRD), transmission electron microscopy with selected area electron diffraction (TEM-SAED), or the like.

Hereinafter, a lithium ion secondary battery using the above-described solid electrolyte will be described. The following description illustrates a specific example of the content of the present invention, and the present invention is not limited by the description. Various changes and modifications can be made by a person skilled in the art within a scope of the technical idea disclosed in the present specification.

The solid electrolyte of the present invention is applicable to an all-solid state lithium battery. In a lithium all-solid state battery in which a positive electrode and a negative electrode made of active material particles capable of storing/releasing lithium ions, a solid electrolyte capable of conducting lithium ions, and a current collector are configured to sandwich a solid electrolyte layer, the above-described solid electrolyte is included in at least one of the positive electrode, the negative electrode, and the solid electrolyte layer, whereby the internal resistance within the battery can be decreased, and a battery having a high rate-property can be provided.

Figure 4:
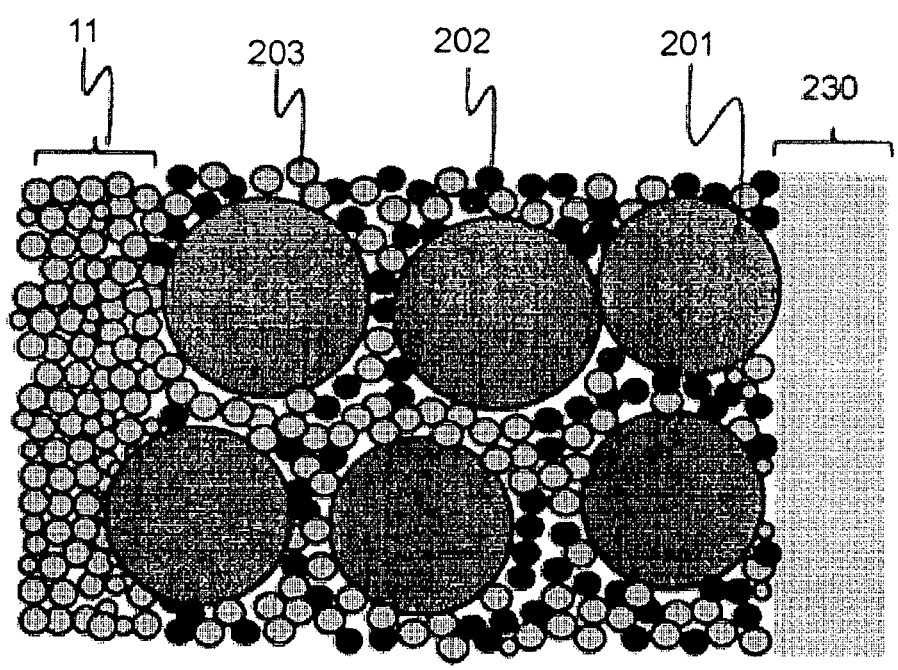
FIG. 4 is a cross-sectional schematic diagram of an electrode.

FIG. 4 is a diagram schematically illustrating an internal structure of a battery according to an embodiment of the present invention. A battery 1 according to an embodiment of the present invention illustrated in FIGS. 1A and 1B is configured from a positive electrode 10, a solid electrolyte 11, a negative electrode 12, a battery can 13, a positive electrode current collection tab 14, a negative electrode current collection tab 15, an inner lid 16, an inner pressure release valve 17, a gasket 18, a positive temperature coefficient (PTC) resistance element 19, a battery lid 20, and a shaft center 21. The battery lid 20 is an integral part made of the inner lid 16, the inner pressure release valve 17, the gasket 18, and the PTC resistance element 19. Further, the positive electrode 10, the solid electrolyte 11, and the negative electrode 12 are wound around the shaft center 21.

An electrode group in which the solid electrolyte 11 is provided between the positive electrode 10 and the negative electrode 12, and the electrolyte and the electrodes are wound around the shaft center 21. Any known shaft center can be used as the shaft center 21 as long as the one can carry the positive electrode 10 and the negative electrode 12. The electrode group can be formed into various shapes, such as a shape in which strip-shaped electrodes are laminated, or a shape in which the positive electrode 10 and the negative electrode 12 are wound into an arbitrary shape like a flat shape, other than the cylindrical shape illustrated in FIGS. 1A and 1B. As the shape of the battery can 13, a cylindrical shape, a flat oval shape, a flat elliptical shape, a square shape, or the like may be selected in accordance with the shape of the electrode group.

The material of the battery can 13 is selected from a material having corrosion resistance against nonaqueous electrolyte, such as aluminum, stainless steel, nickel plated steel, or the like. Further, when the battery can 13 is electrically connected to the positive electrode 10 or the negative electrode 12, the material of the battery container 13 is selected so as not to cause corrosion of the battery can 13 or deterioration of the material due to alloying with lithium ions in a portion where the battery can 13 is in contact with the nonaqueous electrolyte.

Figure 3:
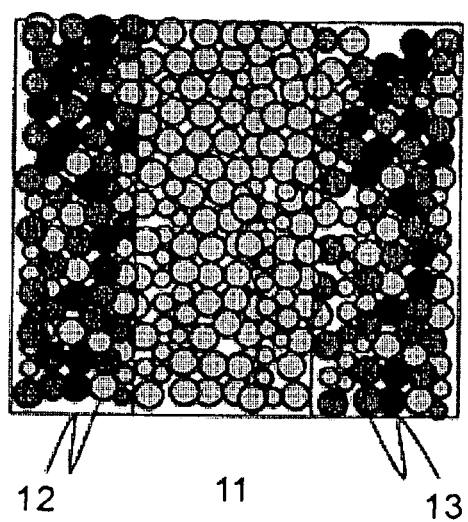
FIG. 3 is a cross-sectional schematic diagram of laminated positive electrode, negative electrode, and solid electrolyte.

FIG. 3 illustrates a cross sectional schematic diagram of the laminated positive electrode 10, solid electrolyte 11, and negative electrode 12. The solid electrolyte 11 is provided between the positive electrode 10 and the negative electrode 12. A separator like a lithium ion secondary battery using an electrolyte solution is not necessarily required.

FIG. 4 schematically illustrates configuration materials of the electrode of the lithium ion secondary battery. While there are differences such as active material particles 201, a conductive additive 202, solid electrolyte particles 203, and a current collector 230 between the positive electrode and the negative electrode, configurations are made like FIG. 4 in common.

While a method of producing a laminated structure made of a negative electrode, an electrolyte layer, and a positive electrode, as illustrated in FIG. 3, is not especially limited, examples are roughly classified into a method of providing the negative electrode layer and the positive electrode layer to both surface of the electrolyte layer, and then laminating a current collector, and a method of sequentially laminating the negative electrode, the electrolyte, and the positive electrode on the current collector in this order, or sequentially laminating the positive electrode, the electrolyte, and the negative electrode on the current collector in this order.

As a method of producing the electrolyte layer, the positive electrode, and the negative electrode, a green sheet method can be used. In this method, a slurry that is a mixture of the powder as each configuration material and a binder resin represented by ethylcellulose is applied on a smooth substrate and dried, a sheet peeled from the substrate is subjected to thermal treatment, and removal of the binder resin and sintering of the powder are performed. To obtain the laminated body of FIG. 3, green sheets are laminated, and are collectively subjected to thermal treatment, so that a laminated body, each layer of which has been sintered, can be obtained. The solid electrolyte obtained in the present invention can be applied to any of a negative electrode, an electrolyte layer, and a positive electrode.

As the active material particles 201 that can be used for a positive electrode active material, a known positive electrode active material capable of storing/releasing lithium ions can be used. For example, the positive electrode active material can be expressed by $LiMO_2$ (M is at least one type of transition metals), and examples of M include Ni, Co, Mn, Fe, Ti, Zr, Al, Mg, Cr, and V. In addition to the above, lithium manganese oxide expressed by $LiMO_2$, lithium cobalt oxide, or lithium nickel oxide can be used where a part of manganese, cobalt, or nickel is substituted by one or two types of transition metals, or is substituted by a metal element, such as magnesium or aluminum. Further, examples include a spinel type, an olivine type, a layered oxide type, a layered solid solution type including excessive Li, a silicate type, and a vanadium oxide type.

As the active material particles 201 that can be used for a negative electrode, a known active material for negative electrode capable of storing/releasing lithium ions can be used. For example, a carbon material represented by graphite, an alloy material, such as a TiSn alloy or a TiSi alloy, or nitride, such as LiCoN, or an oxide, such as $Li_4Ti_5O_{12}$ or $LiTiO_4$ can be used. Further, an all-solid state battery having a negative electrode using a lithium metal foil, and a positive electrode having the configuration of FIG. 3 can be produced.

The material of the electron-conductive additive 202 is not especially limited as long as the material is chemically stable in the electrode, and has high electron-conductivity. Representative example includes carbon black, such as Ketienblack or acetylene black. In addition to the above examples, metal powder of gold, silver, copper, nickel, aluminum, or titanium can be used. Further, among oxides, Sb-doped SnOx, TiOx, or TiNx can be used.

After the wound body is inserted into the battery can 13, the battery lid 20 is closely fitted to the battery can 13, and the entire battery is sealed. When there is an inlet of an electrolyte solution, the inlet is also sealed. As a method of sealing a battery, there are known technologies, such as welding and caulking.

Hereinafter, examples of the solid electrolyte according to the present invention will be described in more detail. However, examples are not limited to the examples disclosed here.

EXAMPLE 1

Production of Nitrogen Substitution $Li_{7+x}La_3Zr_2O_{12-x}N_x$ Solid Electrolyte As one of examples of the present invention, $Li_{7+x}La_3Zr_2O_{12-x}N_x$ in which a part of oxygen was substituted by nitrogen was produced. As starting materials, $Zr_3N_4$ was used as a nitrogen source, in addition to $Li_2CO_3$, $La(OH)_3$, and $ZrO_2$. $Zr_3N_4$ was added aiming at x=0.1 as an N substitution amount in the formula weight.

Weight ratios of $Li_2CO_3$, $La(OH)_3$, $ZrO_2$, and $Zr_3N_4$ are 5.70 g, 11.40 g, 4.74 g, and 0.16 g, respectively, in consideration of volatilization of Li. The mixed Powder is pre-mixed with a mortar, is then put in a dedicated pot with a zirconia ball, and is processed and mixed by planetary ball mill for two hours.

5 g of the obtained mixed powder was put in a carbide die 1 g at a; time, the mixed powder was made into a pellet having a diameter of 10 mm by uniaxial press, the pellet was arranged on a quartz boat and covered with remaining mixed powder as a powder bed for suppression of volatilization of Li and the pre-calcination was performed. The pre-calcination was performed at 700° C. for 24 hours. For suppression of volatilization of nitrogen elements, the pre-calcination was performed in a chamber that can distribute an ammonia gas, the thermal treatment was performed in a 50% ammonia condition, and a Prepcalcination pellet body was obtained.

The obtained pre-calcination pellet body ground with a mortar was made into a pellet again, and the pellet was arranged on a quartz boat made of magnesium oxide. Following that, the powder bed after the pre-calcination used above, to which 1 g of urea had been added, was arranged in a pellet manner. This sample was subjected to the thermal treatment in an atmosphere in which a gas was distributed in the condition of ammonia 50%, and the final calcination was performed. The thermal treatment condition was 1200° C.×36 hours. The final calcination was performed. When the nitrogen amount per weight was evaluated by element analysis, $Li_{7.1}La_3Zr_2O_{11.9}N_{0.1}$ was able to be confirmed. The composition ratio of the substitution element to oxygen was 0.1/11.9×100=0.84%.

EXAMPLE 2

$Li_{7+x}La_3Zr_2O_{12-x}N_x$ was manufactured and measured similarly to Example 1 except that x of $Li_{7+x}La_3Zr_2O_{12-x}N_x$ was 0.5. The charge amounts of $Li_2CO_3$, $La(OH)_3$, $ZrO_2$, and $Zr_3N_4$ that are starting materials were 6.10 g, 11.40 g, 4.00 g, and 0.82 g, respectively, in consideration of volatilization of Li. The obtained compound had a chemical composition as planned, and was confirmed to have a cubic structure by the XRD. The composition ratio of the substitution element to oxygen was 4.34%.

EXAMPLE 3

$Li_{7+x}La_3Zr_2O_{12-x}N_x$ was manufactured and measured similarly to Example 1 except that x of $Li_{7+x}La_3Zr_2O_{12-x}N_x$ was 1.0. The charge amounts of $Li_2CO_3$, $La(OH)_3$, $ZrO_2$, and $Zr_3N_4$ that are starting materials were 6.50 g, 11.40 g, 3.08 g, and 1.64 g, respectively, in consideration of volatilization of Li. The obtained compound had a chemical composition as planned, and was confirmed to have a cubic structure by the XRD. The composition ratio of the substitution element to oxygen was 9.09%.

EXAMPLE 4

$Li_{7+x}La_3Zr_2O_{12-x}N_x$ was manufactured and measured similarly to Example 1 except that x of $Li_{7+x}La_3Zr_2O_{12-x}N_x$ was 1.2. The charge amounts of $Li_2CO_3$, $La(OH)_3$, $ZrO_2$, and $Zr_3N_4$ that are starting materials were 6.66 g, 11.40 g, 2.71 g, and 1.97 g, respectively, in consideration of volatilization of Li. While the obtained compound had a chemical composition as planned, a peak of a cubic structure, a peak derived from a tetragonal structure, and an unidentified phase that cannot be identified to be either the cubic structure or the tetragonal structure were confirmed by the XRD. The composition ratio of the substitution element to oxygen was 11.1%.

EXAMPLE 5

$Li_{7+x}La_3Zr_2O_{12-x}N_x$ was manufactured and measured similarly to Example 1 except that x of $Li_{7+x}La_3Zr_2O_{12-x}N_x$ was 1.5. The charge amounts of $Li_2CO_3$, $La(OH)_3$, $ZrO_2$, and $Zr_3N_4$ that are starting materials were 6.91 g, 11.40 g, 2.15 g, and 2.47 g, respectively, in consideration of volatilization of Li. While the obtained compound had a chemical composition as planned, a peak of a cubic structure, a peak derived from a tetragonal structure, and an unidentified phase that cannot be identified to either the cubic structure or the tetragonal structure were confirmed by the XRD. The composition ratio of the substitution element to oxygen was 14.3%.

EXAMPLE 6

Production of Chlorine Substitution $Li_{7-x}La_3Zr_2O_{12-x}Cl_x$ Solid Electrolyte As one of examples of the present invention, $Li_{7+x}La_3Zr_2O_{12-x}Cl_x$ in which a part of oxygen was substituted by nitrogen was produced. As the starting materials, $ZrCl_4$ was used as the chlorine source, in addition to $Li_2CO_3$, $La(OH)_3$, and $ZrO_2$. In Example 6, $ZrCl_4$ was added aiming at x=0.1 as the Cl substitution amount in the formula weight. The weight ratios of $Li_2CO_3$, $La(OH)_3$, $ZrO_2$, and $ZrCl_4$ were 5.60 g, 11.40 g, 4.87 g, and 0.12 g, respectively, in consideration of volatilization of Li. Similarly to Example 1, the materials were mixed, subjected to pre-calcination, pulverized, molded, then embedded in a powder bed in which the pre-calcinated powder and lithium chloride were added, and put on a quartz boat, and the final calcination was performed in an Ar inert atmosphere at 1200° C. for 36 hours. When the chlorine amount per weight was evaluated by element analysis, the chlorine substitution amount of x 0.1 was able to be confirmed. Further, it was confirmed to have a cubic structure by the XRD. The composition ratio of the substitution element to oxygen was 0.84%.

EXAMPLE 7

$Li_{7-x}La_3Zr_2O_{12-x}Cl_x$ was manufactured and measured similarly to Example 6 except that x of $Li_{7-x}La_3Zr_2O_{12-x}Cl_x$ was 0.5. The charge amounts of $Li_2CO_3$, $La(OH)_3$, $ZrO_2$, and $ZrCl_4$ that are starting materials were 5.30 g, 11.40 g, 4.62 g, and 0.58 g, respectively, in consideration of volatilization of Li. When the chlorine amount per weight was evaluated by element analysis, the chlorine substitution amount of x=0.5 was able to be confirmed. Further, it was confirmed to have a cubic structure by the XRD. The composition ratio of the substitution element to oxygen was 4.34%.

EXAMPLE 8

$Li_{7-x}La_3Zr_2O_{12-x}Cl_x$ was manufactured and measured similarly to Example 6 except that x of $Li_{7-x}La_3Zr_2O_{12-x}Cl_x$ was 1.0. The charge amounts of $Li_2CO_3$, $La(OH)_3$, $ZrO_2$, and $ZrCl_4$ that are starting materials were 4.88 g, 11.40 g, 4.31 g, and 1.16 g, respectively, in consideration of volatilization of Li. When the chlorine amount per weight was evaluated by element analysis, the chlorine substitution amount of x=1.0 was able to be confirmed. Further, it was confirmed to have a cubic structure by the XRD. The composition ratio of the substitution element to oxygen was 9.09%.

EXAMPLE 9

$Li_{7-x}La_3Zr_2O_{12-x}Cl_x$ was manufactured and measured similarly to Example 6 except that x of $Li_{7-x}La_3Zr_2O_{12-x}Cl_x$ was 1.2. The charge amounts of $Li_2CO_3$, $La(OH)_3$, $ZrO_2$, and $ZrCl_4$ that are starting materials were 4.71 g, 11.40 g, 4.19 g, and 1.39 g, respectively, in consideration of volatilization of Li. The obtained compound had a chemical composition as planned, and was confirmed to have a cubic structure by the XRD. When the chlorine amount per weight was evaluated by element analysis, the chlorine substitution amount of x=1.2 was able to be confirmed. A peak of a cubic structure, a peak derived from a tetragonal structure, and an unidentified phase that cannot be identified to be either the cubic structure or the tetragonal structure were confirmed by the XRD. The composition ratio of the substitution element to oxygen was 11.1%.

EXAMPLE 10

$Li_{7-x}La_3Zr_2O_{12-x}Cl_x$ was manufactured and measured similarly to Example 6 except that x of $Li_{7-x}La_3Zr_2O_{12-x}Cl_x$ was 1.5. The charge amounts of $Li_2CO_3$, $La(OH)_3$, $ZrO_2$, and $ZrCl_4$ that are starting materials were 4.47 g, 11.40 g, 4.00 g, and 1.74 g, respectively, in consideration of volatilization of Li. The obtained compound had a chemical composition as planned, and was confirmed to have a cubic structure by the XRD. When the chlorine amount per weight was evaluated by element analysis, the chlorine substitution amount of x=1.5 was able to be confirmed. A peak of a cubic structure, a peak derived from a tetragonal structure, and an unidentified phase that cannot be identified to be either the cubic structure or the tetragonal structure were confirmed by the XRD. The composition ratio of the substitution element to oxygen was 14.3%.

EXAMPLE 11

Production of Sulfur Substitution $Li_7La_3Zr_2O_{12-x}S_x$ Solid Electrolyte

As one of examples of the present invention, $Li_7La_3Zr_2O_{12-x}S_x$ in which a part of oxygen was substituted by nitrogen was produced. As the starting materials, $ZrS_2$ was used as the sulfur source, in addition to $Li_2CO_3$, $La(OH)_3$, and $ZrO_2$. Since $ZrS_2$ easily reacts in the atmosphere, the materials were treated in an Ar atmosphere. In Example 11, $ZrS_4$ was added aiming at x=0.1 as the S substitution amount in the formula weight. The weight ratios of $Li_2CO_3$, $La(OH)_3$, $ZrO_2$, and $ZrS_2$ were 5.69 g, 11.40 g, 4.81 g, and 0.16 g, respectively, in consideration of volatilization of Li. Similarly to Example 1, the materials were mixed, subjected to pre-calcination, pulverized, molded, then embedded in a powder bed in which the pre-calcinated powder and lithium sulfide were added, and put on a quartz boat, and the final calcination was performed in an Ar inert atmosphere at 1200° C. for 36 hours. When the sulfur amount per weight was evaluated by element analysis, the substitution amount of x=0.1 was obtained. The obtained compound had a chemical composition as planned, and was confirmed to have a cubic structure by the XRD. The composition ratio of the substitution element to oxygen was 0.84%.

EXAMPLE 12

$Li_7La_3Zr_2O_{12-x}S_x$ was manufactured and measured similarly to Example 11 except that x of $Li_7La_3Zr_2O_{12-x}S_x$ was 0.5. The charge amounts of $Li_2CO_3$, $La(OH)_3$, $ZrO_2$, and $ZrS_2$ that are starting materials were 5.69 g, 11.40 g, 4.31 g, and 0.78 g, respectively, in consideration of volatilization of Li. As a result of element analysis, the obtained compound was confirmed to have the substitution amount of x=0.5. The obtained compound had a chemical composition as planned, and was confirmed to have a cubic structure by the XRD. The composition ratio of the substitution element to oxygen was 4.34%.

EXAMPLE 13

$Li_7La_3Zr_2O_{12-x}S_x$ was manufactured and measured similarly to Example 11 except that x of $Li_7La_3Zr_2O_{12-x}S_x$ was 1.0. The charge amounts of $Li_2CO_3$, $La(OH)_3$, $ZrO_2$, and $ZrS_2$ that are starting materials were 5.69 g, 11.40 g, 3.70 g, and 1.55 g, respectively, in consideration of volatilization of Li. As a result of element analysis, the obtained compound was confirmed to have the substitution amount of x=1.0. The obtained compound had a chemical composition as planned, and was confirmed to have a cubic structure by the XRD. The composition ratio of the substitution element to oxygen was 9.09%.

EXAMPLE 14

$Li_7La_3Zr_2O_{12-x}S_x$ was manufactured and measured similarly to Example 11 except that x of $Li_7La_3Zr_2O_{12-x}S_x$ was 1.2. The charge amounts of $Li_2CO_3$, $La(OH)_3$, $ZrO_2$, and $ZrS_2$ that are starting materials were 5.69 g, 11.40 g, 3.45 g, and 1.86 g, respectively, in consideration of volatilization of Li. As a result of element analysis, the obtained compound was confirmed to have the substitution amount of x=1.2. While the obtained compound had a chemical composition as planned, a peak of a cubic structure, a peak derived from a tetragonal structure, and an unidentified phase that cannot be identified to either the cubic structure or the tetragonal structure were confirmed by the XRD. The composition ratio of the substitution element to oxygen was 11.1%.

EXAMPLE 15

$Li_7La_3Zr_2O_{12-x}S_x$ was manufactured and measured similarly to Example 11 except that x of $Li_7La_3Zr_2O_{12-x}S_x$ was 1.5. The charge amounts of $Li_2CO_3$, $La(OH)_3$, $ZrO_2$, and $ZrS_2$ that are starting materials were 5.69 g, 11.40 g, 3.08 g, and 2.33 g, respectively, in consideration of volatilization of Li. As a result of element analysis, the obtained compound was confirmed to have the substitution amount of x=1.5. While the obtained compound had a chemical composition as planned, a peak of a cubic structure, a peak derived from a tetragonal structure, and an unidentified phase that cannot be identified to either the cubic structure or the tetragonal structure were confirmed by the XRD. The composition ratio of the substitution element to oxygen was 14.3%.

EXAMPLE 16

Production of selenium Substitution $Li_7La_3Zr_2O_{12-x}Se_x$ Solid Electrolyte As one of examples of the present invention, $Li_7La_3Zr_2O_{12-x}Se_x$ in which a part of oxygen was substituted by selenium was produced. As the starting materials, $ZrSe_2$ was used as the selenium source, in addition to $Li_2CO_3$, $La(OH)_3$, and $ZrO_2$. Since $ZrSe_2$ easily reacts in the atmosphere, the materials were treated in an Ar atmosphere, similarly to Examples 11 to 15. In Example 16, $ZrSe_2$ was added aiming at x=0.1 as the Se substitution amount in the formula weight. The weight ratios of $Li_2CO_3$, $La(OH)_3$, $ZrO_2$, and $ZrSe_2$ were 5.69 g, 11.40 g, 4.81 g, and 0.25 g, respectively, in consideration of volatilization of Li. Similarly to Example 1, the materials were mixed, subjected to pre-calcination, pulverized, molded, then embedded in a powder bed in which the pre-calcinated powder and $ZrSe_2$ were added, and put on a quartz boat, and the final calcination was performed in an Ar inert atmosphere at 1200° C. for 36 hours. When the Se amount per weight was evaluated by element analysis, it was confirmed that the substitution amount of x=0.1 was able to be obtained, as planned. The obtained compound had a chemical composition as planned, and was confirmed to have a cubic structure by the XRD. The composition ratio of the substitution element to oxygen was 0.84%.

EXAMPLE 17

$Li_7La_3Zr_2O_{12-x}Se_x$ was manufactured and measured similarly to Example 16, except that x of $Li_7La_3Zr_2O_{12-x}Se_x$ was 0.5. The charge amounts of $Li_2CO_3$, $La(OH)_3$, $ZrO_2$, and $ZrSe_2$ that are starting materials were 5.69 g, 11.40 g, 4.31 g, and 1.25 g, respectively, in consideration of volatilization of Li. As a result of element analysis, the obtained compound was confirmed to have the substitution amount of x=0.5. The obtained compound had a chemical composition as planned, and was confirmed to have a cubic structure by the XRD. The composition ratio of the substitution element to oxygen was 4.34%.

EXAMPLE 18

$Li_7La_3Zr_2O_{12-x}Se_x$ was manufactured and measured similarly to Example 16, except that x of $Li_7La_3Zr_2O_{12-x}Se_x$ was 1.0. The charge amounts of $Li_2CO_3$, $La(OH)_3$, $ZrO_2$, and $ZrSe_2$ that are starting materials were 5.69 g, 11.40 g, 3.70 g, and 2.50 g, respectively, in consideration of volatilization of Li. As a result of element analysis, the obtained compound was confirmed to have the substitution amount of x=1.0. The obtained compound had a chemical composition as planned, and was confirmed to have a cubic structure by the XRD. The composition ratio of the substitution element to oxygen was 9.09%.

EXAMPLE 19

$Li_7La_3Zr_2O_{12-x}Se_x$ was manufactured and measured similarly to Example 16, except that x of $Li_7La_3Zr_2O_{12-x}Se_x$ was 1.2. The charge amounts of $Li_2CO_3$, $La(OH)_3$, $ZrO_2$, and $ZrSe_2$ that are starting materials were 5.69 g, 11.40 g, 3.45 g, and 2.99 g, respectively, in consideration of volatilization of Li. As a result of element analysis, the obtained compound was confirmed to have the substitution amount of x=1.2. While the obtained compound had a chemical composition as planned, a peak of a cubic structure, a peak derived from a tetragonal structure, and an unidentified phase that cannot be identified to either the cubic structure or the tetragonal structure were confirmed by the XRD. The composition ratio of the substitution element to oxygen was 11.1%.

EXAMPLE 20

$Li_7La_3Zr_2O_{12-x}Se_x$ was manufactured and measured similarly to Example 16, except that x of $Li_7La_3Zr_2O_{12-x}Se_x$ was 1.5. The charge amounts of $Li_2CO_3$, $La(OH)_3$, $ZrO_2$, and $ZrSe_2$ that are starting materials were 5.69 g, 11.40 g, 3.08 g, and 3.73 g, respectively, in consideration of volatilization of Li. As a result of element analysis, the obtained compound was confirmed to have the substitution amount of x=1.5. While the obtained compound had a chemical composition as planned, a peak of a cubic structure, a peak derived from a tetragonal structure, and an unidentified phase that cannot be identified to either the cubic structure or the tetragonal structure were confirmed by the XRD. The composition ratio of the substitution element to oxygen was 14.3%.

EXAMPLE 21

Production of Tellurium Substitution $Li_7La_3Zr_2O_{12-x}Te_x$ Solid Electrolyte As one of examples of the present invention, $Li_7La_3Zr_2O_{12-x}Te_x$ in which a part of oxygen was substituted by tellurium was produced. As the starting materials, $ZrTe_2$ was used as the Te source, in addition to $Li_2CO_3$, $La(OH)_3$, and $ZrO_2$. Since $ZrTe_2$ easily reacts in the atmosphere, the materials were treated in an Ar atmosphere, similarly to Examples 11 to 15. In Example 21, $ZrTe_2$ was added aiming at x=0.1 as the Te substitution amount in the formula weight. The weight ratios of $Li_2CO_3$, $La(OH)_3$, $ZrO_2$, and $ZrTe_2$ were 5.69 g, 11.40 g, 4.81 g, and 0.35 g, respectively, in consideration of volatilization of Li. Similarly to Example 1, the materials were mixed, subjected to pre-calcination, pulverized, molded, then embedded in a powder bed in which the pre-calcinated powder and $ZrTe_2$ were added, and put on a quartz boat, and the final calcination was performed in an Ar inert atmosphere at 1200° C. for 36 hours. When the Te amount per weight was evaluated by element analysis, the substitution amount of x=0.1 was obtained, as planned. The obtained compound had a chemical composition as planned, and was confirmed to have a cubic structure by the XRD. The composition ratio of the substitution element to oxygen was 0.84%.

EXAMPLE 22

$Li_7La_3Zr_2O_{12-x}Te_x$ was manufactured and measured similarly to Example 21, except that x of $Li_7La_3Zr_2O_{12-x}Te_x$ was 0.5. The charge amounts of $Li_2CO_3$, $La(OH)_3$, $ZrO_2$, and $ZrTe_2$ that are starting materials were 5.69 g, 11.40 g, 4.31 g, and 1.73 g, respectively, in consideration of volatilization of Li. As a result of element analysis, the obtained compound was confirmed to have the substitution amount of x=0.5. The obtained compound had a chemical composition as planned, and was confirmed to have a cubic structure by the XRD. The composition ratio of the substitution element to oxygen was 4.34%.

EXAMPLE 23

$Li_7La_3Zr_2O_{12-x}Te_x$ was manufactured and measured similarly to Example 21, except that x of $Li_7La_3Zr_2O_{12-x}Te_x$ was 1.0. The charge amounts of $Li_2CO_3$, $La(OH)_3$, $ZrO_2$, and $ZrTe_2$ that are starting materials were 5.69 g, 11.40 g, 3.69 g, and 3.46 g, respectively, in consideration of volatilization of Li. As a result of element analysis, the obtained compound was confirmed to have the substitution amount of x=1.0. While the obtained compound had a chemical composition as planned, a peak of a cubic structure, a peak derived from a tetragonal structure, and an unidentified phase that cannot be identified to either the cubic structure or the tetragonal structure were confirmed by the XRD. The composition ratio of the substitution element to oxygen was 9.09%.

EXAMPLE 24

$Li_7La_3Zr_2O_{12-x}Te_x$ was manufactured and measured similarly to Example 21, except that x of $Li_7La_3Zr_2O_{12-x}Te_x$ was 1.2. The charge amounts of $Li_2CO_3$, $La(OH)_3$, $ZrO_2$, and $ZrTe_2$ that are starting materials were 5.69 g, 11.40 g, 3.45 g, and 4.15 g, respectively, in consideration of volatilization of Li. As a result of element analysis, the obtained compound was confirmed to have the substitution amount of x=1.2. While the obtained compound had a chemical composition as planned, a peak of a cubic structure, a peak derived from a tetragonal structure, and an unidentified phase that cannot be identified to either the cubic structure or the tetragonal structure were confirmed by the XRD. The composition ratio of the substitution element to oxygen was 11.1%.

EXAMPLE 25

$Li_7La_3Zr_2O_{12-x}Te_x$ was manufactured and measured similarly to Example 21, except that x of $Li_7La_3Zr_2O_{12-x}Te_x$ was 1.5. The charge amounts of $Li_2CO_3$, $La(OH)_3$, $ZrO_2$ and $ZrTe_2$ that are starting materials were 5.69 g, 11.40 g, 3.08 g, and 5.19 g, respectively, in consideration of volatilization of Li. As a result of element analysis, the obtained compound was confirmed to have the substitution amount of x=1.2. While the obtained compound had a chemical composition as planned, a peak of a cubic structure, a peak derived from a tetragonal structure, and an unidentified phase that cannot be identified to either the cubic structure or the tetragonal structure were confirmed by the XRD. The composition ratio of the substitution element to oxygen was 14.3%.

EXAMPLE 26

Production of Aluminum and Nitrogen Substitution $Li_{7+x-3y}Al_yLa_3Zr_2O_{12-x}N_x$ Solid Electrolyte As one of examples of the present invention, $Li_{7+x-3y}Al_yLa_3Zr_2O_{12-x}N_x$ in which a part of oxygen was substituted by nitrogen, and the lithium site was substituted by Al was produced. As the starting materials, AlN was used as the nitrogen source, in addition to $Li_2CO_3$, $La(OH)_3$, and $ZrO_2$. AlN was added aiming at x=0.5 as the N substitution amount in the formula weight, and aiming at y=0.5 as the Al substitution amount. The charge amounts of $Li_2CO_3$, $La(OH)_3$, $ZrO_2$, and AlN that are starting materials were 4.87 g, 11.40 g, 4.92 g, and 0.41 g, respectively, in consideration of volatilization of Li Similarly to Examples 1 to 5, the materials were mixed, subjected to pre-calcination, pulverized, molded, then embedded in a powder bed in which the pre-calcinated powder and urea were added, and put on a quartz boat, and the final calcination was performed in an Ar inert atmosphere at 1200° C. for 36 hours. It was confirmed to be able to obtain $Li_6Al_{0.5}La_3Zr_2O_{11.5}N_{0.5}$ according to element analysis. It was confirmed to obtain a garnet structure of a cubic structure according to an XRD result. This is Example 26. The composition ratio of the substitution element to oxygen was 9.09%.

COMPARATIVE EXAMPLE 1

Production of Garnet Type $Li_7La_3Zr_2O_{12}$ Solid Electrolyte $Li_7La_3Zr_2O_{12}$ used as Comparative Example was produced. As the starting materials, $Li_2CO_3$, $La(OH)_3$, and $ZrO_2$ were used. The charge amounts of $Li_2CO_3$, $La(OH)_3$, and $ZrO_2$ that are starting materials were 5.69 g, 11.40 g, and 4.92 g, respectively, in consideration of volatilization of Li. The mixed powder is premixed with a mortar, is then put in a dedicated pot with a zirconia ball, and is processed and mixed by planetary ball mill for two hours. 5 g of the obtained mixed powder was put in a carbide die 1 g at a time, the mixed powder was made into a pellet having a diameter of 10 mm by uniaxial press, the pellet was arranged on a quartz boat and covered with remaining mixed powder as a powder bed for suppression of volatilization of Li, and the pre-calcination was performed at 700° C. After the pre-calcination powder was pulverized and molded into the size of 10 mmφ×1 mmt, the molded sample was put in a powder bed using the pre-calcinated powder, and the final calcination was performed in the condition of 1200° C.×36 hours. $Li_7La_3Zr_2O_{12}$ having a garnet structure was obtained according to an XRD result. This is Comparative Example 1.

[Evaluation of Ion Conductivity]

The ion conductivity was evaluated using electrochemical impedance spectroscopy analysis. Au was applied by 100 nm to both surfaces of produced pellet by sputtering method, and a blocking electrode was obtained. A current collector was attached to Au in a glove box in an Ar atmosphere, and a current terminal and a voltage terminal were attached. The Au with the current collector and the terminals were sealed and transferred to a thermostat bath outside the glove box. The temperature of the thermostat bath was changed between 25 and 100° C., and electrochemical impedance measurement was performed. A resistance value was obtained from a radius of an obtained arc, and the conductivity was calculated using electrode areas and a sample thickness. The conductivity was measured at each temperature, and the activation energy ($E_a$) related to the ion conductivity was obtained from an inclination of Arrhenius plot. Note that it was confirmed that, in any of the samples, the direct resistance was extremely large, and the electron conductivity in the sample was sufficiently lower than the ion conductivity.

[Evaluation Results and Consideration of Ion Conductivity]

Table 1 illustrates the ion conductivity and the activation energy of the solid electrolyte of the present invention at room temperature. In Examples, the ion conduction measurement was performed where the substitution amounts x in the formula weight were 0.1, 0.5, and 1.0.

TABLE 1

| Sample name | Composition | Ion conductivity [mS/cm] | Activation energy [kJ/mol] |
|---|---|---|---|
| Comparative Example 1 | $Li_7La_3Zr_2O_{12}$ | 0.24 | 34.0 |
| Example 1 | $Li_{7.1}La_3Zr_2O_{11.9}N_{0.1}$ | 0.46 | 32.4 |
| Example 2 | $Li_{7.5}La_3Zr_2O_{11.5}N_{0.5}$ | 0.80 | 31.0 |
| Example 3 | $Li_8La_3Zr_2O_{11}N_1$ | 0.50 | 31.9 |
| Example 6 | $Li_{6.9}La_3Zr_2O_{11.9}Cl_{0.9}$ | 0.36 | 33.0 |
| Example 7 | $Li_{6.5}La_3Zr_2O_{11.5}Cl_{0.5}$ | 0.46 | 32.4 |
| Example 8 | $Li_6La_3Zr_2O_{11}Cl_1$ | 0.36 | 33.0 |
| Example 11 | $Li_7La_3Zr_2O_{11.9}S_{0.1}$ | 0.49 | 32.2 |
| Example 12 | $Li_7La_3Zr_2O_{11.5}S_{0.5}$ | 0.53 | 32.0 |
| Example 13 | $Li_7La_3Zr_2O_{11}S_{1.0}$ | 0.36 | 33.0 |
| Example 16 | $Li_7La_3Zr_2O_{11.9}Se_{0.1}$ | 0.58 | 31.8 |
| Example 17 | $Li_7La_3Zr_2O_{11.5}Se_{0.5}$ | 0.36 | 33.0 |
| Example 18 | $Li_7La_3Zr_2O_{11}Se_1$ | 0.29 | 33.5 |
| Example 21 | $Li_7La_3Zr_2O_{11.9}Te_{0.1}$ | 0.65 | 31.5 |
| Example 22 | $Li_7La_3Zr_2O_{11.5}Te_{0.5}$ | 0.34 | 33.1 |
| Example 23 | $Li_7La_3Zr_2O_{11}Te_1$ | 0.25 | 33.9 |
| Example 26 | $Li_6Al_{0.5}La_3Zr_2O_{11.5}N_{0.5}$ | 1.40 | 29.0 |

All of the electrolytes in which a part of oxygen was substituted by the element (N, Cl, S, Se, and Te) having lower electronegativity had higher ion conductivity than Comparative Example 1. Comparing Examples 1, 6, 11, 16, and 21 where the substitution was performed with x 0.1, an electrolyte substituted by an element having higher electronegativity was more decreased in the activation energy. As a result, the ion conductivity tended to be larger. That is, the effect of the ion conductivity improvement becomes higher if substitution is made with a material having lower electronegativity where the substitution amount is the same. However, the conductivity of S, Se, and Te having large electronegativity was deteriorated in accordance with an increase in the substitution amount. This is because these substitution atoms have large atomic radiuses, and thus the crystal structure is easily collapsed, and the conduction path of the lithium ions is more likely to be impeded. Meanwhile, in the case of nitrogen, the ion conductivity is easily improved in accordance with the increase in x, and in Example 2, relatively high ion conductivity of 0.8 mS was able to be obtained. Further, in Example 26 in which the Al substitution and the N substitution were conducted together, it was found out that the activation energy was further decreased, and high ion conduction was expected.

[Production of All-solid State Battery]

Pellet type all-solid state batteries were produced using the produced Comparative Example 1 and Example 26 according to the following flow.

(1) With respect to the $LiCoO_2$ having an average particle diameter of 12 μm, the solid electrolyte powder having an average particle diameter of 0.8 μm, Ketienblack as the electron-conductive additive, and lithium borate ($Li_3BO_3$) as the sintering additive were put in the mortar with respective weight ratios of 60:25:10:5 and were mixed. The ethylcellulose solution was added thereto such that the binder ratio to the powder becomes 7:3 and was mixed, and positive layer slurry was produced.

(2) The slurry obtained in (1) was applied to one surface of the electrolyte pellets (0.8 mm thickness) of Comparative Example 1 and Example 26, and the pellets with slurry were subjected to thermal treatment at 400° C. for 30 minutes, and at 700° C. for two hours, and a positive electrode layer was burned. The positive electrode thickness was about 20 μm.

(3) Au was formed by 200 nm on the side where the positive electrode layer was applied by sputtering, and a current collector was obtained. A Li foil was attached to the other surface, heated by a hot plate, and welded, and the obtained pellets were attached to evaluation jigs.

[Evaluation of All-solid State Battery]

Regarding the pellet type all-solid state batteries using the produced Comparative Example 1 and Example 26, the batteries were charged at 0.05 C and then discharged to satisfy SOC (state of charge)=50% using the 1480 potentiostat manufactured by Solartron Metrology. After the batteries were held for one hour, the alternative current resistance was evaluated using an electrochemical impedance device. It was confirmed that the resistance of the all-solid state battery using Example 26 was reduced by half. This can be considered to be the effect of ion conductivity improvement of the used solid electrolyte. Such an all-solid state battery is expected to show a high rate-property.

The present invention can be used for a solid electrolyte having high ion conductivity, and an all-solid state lithium secondary battery, a lithium-air battery, a sensor, and the like using the solid electrolyte.

What is claimed is:

1. A solid electrolyte for a lithium ion secondary battery having a composition formula expressed by $Li_{7+x}La_3Zr_2O_{12-x}N_x$, wherein $0<x<1.2$, and a composition ratio of nitrogen (N) to oxygen (O) is in a range from 0.1% to 10%.

2. The solid electrolyte for lithium ion secondary battery according to claim 1, wherein the solid electrolyte for lithium ion secondary battery is expressed by a chemical composition formula $Li_{7+x-3y}A_yLa_3Zr_2O_{12-x}N_x$ (A is at least one type of Al and Ga in the formula, and $0<x<1.2$) in which lithium in a crystal structure is substituted by A.

3. A lithium ion secondary battery comprising:
a positive electrode configured to store and/or release lithium ions;
a negative electrode configured to store and/or release lithium ions, wherein
the solid electrolyte for lithium ion secondary battery according to claim 1 is disposed between the positive electrode and the negative electrode.

4. A method of manufacturing the solid electrolyte for lithium ion secondary battery according to claim 1, wherein a metal salt having Nitrogen or N as a constituent element is at least included in a raw material, and the solid electrolyte is obtained by being subjected to thermal treatment in a gas atmosphere containing a compound having Nitrogen or N as a constituent element at a time of synthesis.

5. The method of manufacturing the solid electrolyte for lithium ion secondary battery according to claim 4, wherein the compound is ammonia ($NH_3$).

* * * * *